United States Patent [19]

Dreyer et al.

[11] 4,422,392
[45] Dec. 27, 1983

[54] SEED DRILL WITH DISK-TYPE FURROW OPENERS

[75] Inventors: Heinz Dreyer, Hasbergen-Gaste; Benno Wiemeyer, Osnabrück-Pye, both of Fed. Rep. of Germany

[73] Assignee: Amazonen Werke AG H. Dreyer, Hasbergen-Gaste, Fed. Rep. of Germany

[21] Appl. No.: 382,340

[22] Filed: May 26, 1982

Related U.S. Application Data

[63] Continuation of Ser. No. 170,215, Jul. 18, 1980, abandoned.

[30] Foreign Application Priority Data

Jul. 21, 1979 [DE] Fed. Rep. of Germany ....... 2929622
Feb. 8, 1980 [DE] Fed. Rep. of Germany ....... 3004587

[51] Int. Cl.³ .............................................. A01C 5/00
[52] U.S. Cl. ..................................... 111/52; 111/85; 111/87; 172/188; 172/392; 172/394; 172/674
[58] Field of Search ................ 111/59, 87, 52, 83–88; 172/165, 166, 188, 387, 389, 392, 394, 643, 674, 707, 710, 727, 729, 764

[56] References Cited

U.S. PATENT DOCUMENTS

| | | | |
|---|---|---|---|
| 354,557 | 12/1886 | LaDow | 172/707 X |
| 361,792 | 4/1887 | Sweet | 172/707 X |
| 468,446 | 2/1892 | Brooks | 172/707 X |
| 480,705 | 8/1892 | Brant | 172/707 X |
| 637,192 | 11/1899 | Whipple | 172/674 X |
| 1,392,732 | 10/1921 | Zarmstorf | 172/394 X |
| 1,747,525 | 2/1930 | Nagy | 111/87 X |
| 2,376,559 | 5/1945 | Smith | 111/59 |
| 3,252,524 | 5/1966 | van der Lely et al. | 172/707 |
| 3,705,560 | 12/1972 | Lappin | 111/85 |
| 3,800,881 | 4/1974 | Washburn | 172/165 |

FOREIGN PATENT DOCUMENTS

| | | | |
|---|---|---|---|
| 306612 | 7/1918 | Fed. Rep. of Germany | 172/707 |
| 708660 | 7/1031 | France | 172/165 |
| 2384436 | 11/1978 | France | 111/87 |
| 135848 | 6/1979 | German Democratic Rep. | 111/87 |

*Primary Examiner*—James R. Feyrer
*Attorney, Agent, or Firm*—Sprung, Horn, Kramer & Woods

[57] ABSTRACT

A seed drill has rotatably mounted opener discs disposed in an acute angle with respect to the direction of travel and mounted on supports. A skid is mounted to each support at the outside surface of the disk at an angle with respect to the direction of travel. Each skid includes a trailing portion configured to have a sliding surface disposed above the depth of penetration of the disk in the ground and a leading portion bent upwardly in the direction of travel and having a recess in the side thereof facing the disk and which extends beyond the forwardmost portion of the disk in the direction of travel. Each skid is releasably connected to the support for pivotal movement of the trailing portion towards and away from the ground by a lever pivotable with the skid, a spring connected between the lever arm and the support for biasing the trailing portion of the skid towards the ground and an adjustable stop mounted on the support and engageable with the lever arm to limit the free pivotal movement of the skid in the upward direction.

7 Claims, 8 Drawing Figures

SEED DRILL WITH DISK-TYPE FURROW OPENERS

This is a continuation of application Ser. No. 170,215, filed July 18, 1980, now abandoned.

BACKGROUND OF THE INVENTION

The invention relates to a seed drill with disk-type furrow openers which are rotatably supported on mounts displaceable in the vertical plane and whose individual furrow-opener disks are set at an acute angle relative to the direction of travel, there being disposed on said mounts skids which extend close to the outside of the individual opener disks, angled relative to the direction of travel, and whose sliding surface is located above the intended depth of soil penetration of the opener disks, in accordance with German patent application No. P 28 14 883.6, which corresponds with U.S. application Ser. No. 027,321, filed Apr. 5, 1974.

The seed drill there described has been found to be well suited for use particularly in direct seeding, that is to say, for placing seed in soil previously prepared for planting by means of cultivating implements, since in that application it is important that the root-infested soil raised by the furrow-opener disks not be turned over but be moved back unturned into the seeded furrow behind the opener disks, and that the tough stalks from the previous crop which the opener disks force into the soil rise again from the bottom of the furrow before the seeds are deposited so that the seeds are able to drop through them to the bottom of the furrow before the latter is closed.

Only when considerable plant growth has sprung up in the fields to be planted, or when there is an abundance of plant residues from the previous crop on the ground, will clogging between the furrow-opener disks and the skids occur. Such clogging will then necessarily disrupt planting.

However, when used in fields which have been conventionally prepared for planting by means of various cultivating implements, this seed drill has the drawback that the loose soil, particularly when it is moist and sticky, will adhere to the sliding surfaces of the skids, with the result that the latter will start to burrow in the soil and must be rid at frequent intervals of the adhering soil, which is time-consuming. A further disadvantage in this application and under these conditions is that such soil will also stick to the treads of the press wheels, thereby increasing the diameter of the latter and lifting the furrow-opener disks out of the ground. The adhering soil must then also be scraped off the press wheels at frequent intervals, which, too, is a tedious chore.

SUMMARY OF THE INVENTION

The invention has as its object to improve the performance of the prior-art seed drill both in direct seeding and in conventional use.

In accordance with the invention, this object is accomplished by providing every skid with a portion which obliquely extends forwardly and upwardly and projects beyond the furrow-opener disk in the direction of travel, said portion being arranged detachably on one side of the mount of said disk.

This expedient permits even fairly large volumes of plant parts present on the ground to get under the sliding surfaces of the skids without causing trouble, and to be forced into the furrows behind the furrow-opener disks along with the root-infested soil raised by said disks without that soil being turned over. In the process, the behavior of the stalks which have been forced into the soil by the opener disks and cannot be cut up is improved, moreover, in that a certain tension is imparted to these stalks as they are caught both by the opener disks and by the skids, and that tension then causes them to rise from the bottom of the furrow before the seeds are deposited, with the result that the seeds are able to drop through them to the bottom of the furrow and thus make the soil contact necessary to their germination.

When the seed drill is to be used in conventionally prepared fields, on the other hand, the skids can readily be removed from the mounts and therefore will not hinder the deposition of the seed in the furrows.

In one advantageous embodiment of the invention, the free end of the forward portion of every skid is pivoted to the mount of a furrow-opener disk and provided with a locking member that is angled over the mount, a latching member adapted to be moved over the locking member being disposed on each mount. The individual skids can thus be secured by the latching member against pivoting upwardly when the seed drill is employed in direct seeding, while for the conventional use thereof the latching member is moved away from the locking member so that the skids are free to pivot upwardly and need not be taken off. When the furrow-opener disks are raised for road transport, the locking members then abut on the mounts, thus preventing the skids from pivoting downwardly, and maintaining them along with the furrow-opener disks at a sufficient distance above the ground.

In another embodiment of the invention, the free end of the forward portion of each skid is pivoted to the mount of a furrow-opener disk and provided with a lever arm cooperating with an adjustable stop. By means of these stops the skid can be moved into and maintained in a position adapted to both the depth of penetration of the furrow-opener disks and to the volume of the plant parts present on the ground, as well as in an inoperative position intended for conventional use of the seed drill. Now if each skid is associated with a resilient element which acts thereon in the direction of the ground, the skids will automatically adapt to different densities of plant parts present on the ground and exert on these plant parts a more or less constant pressure in the direction of the ground. The skids then are also able to yield to any stones which may protrude from the ground without the depth of soil penetration of the furrow-opener disks being affected thereby.

The same effect is achieved when the skids are made of a resilient material. Still more resilient adaptation of the skids to the prevailing soil and overgrowth conditions is secured by providing the forward portion of each skid with a spiral surrounding its point of attachment to the mount. Now if an adjustable contact member acting externally on said spiral is provided for each skid, the skids may, in addition, be readily adapted to the volume of plant parts or moved into the inoperative position.

A particularly simple provision for moving the skids into the inoperative position and maintaining them therein is made by associating with each skid a disengaging element for fixing the skid in a position far removed from the ground.

Also in accordance with the invention, the skids are provided on the side facing the furrow-opener disks with a recess which extends both ways beyond the periphery of the furrow-opener disks, viewed in the direction of travel. Even when there is a superabundance of tough stalks on the ground, this provision will prevent such stalks from becoming stuck to the mounts of the furrow-opener disks, where they might interfere with the operation of these disks as well as of the skids.

It is further contemplated to provide the latching member with at least two additional stops for different operating positions. This provision will permit adapting the mode of operation of the skid to the application in which the seed drill is to be used to assure deposition of the individual seeds at optimum depth.

Moreover, it is contemplated in accordance with the invention that the stops on the latching member be constructed as projections, and that an additional stop be disposed on the latching member below the locking member. The latching member may then be provided at modest cost with projections in the form of dogs, for example, so that it may be used for the various operating positions. Moreover, the additional stop will serve to limit the pivoting range of the skid downwardly.

When the stops on the latching member are formed by a slotted-link guide into which the locking member projects, the skid can readily be positioned. Moreover, in accordance with the invention, protuberances are provided between the stops within the slotted-link guide. With the aid of these protuberances it is readily possible to obtain the pivoting range for the skids required by a particular use without having to visually ascertain the range of the slotted-link guide, simply by observing the skid motion produced by said protuberances in the positioning process. The arcuate design in accordance with the invention of the contours of the slotted-link guide and of the protuberances furthermore serves to compensate for minor shifting of the position of the latching member, often unavoidable in use, the latching member being forced back, by the locking member projecting into the slotted-link guide, into the particular position into which it was moved.

Particularly for use of the seed drill in fields which have been prepared for planting by means of cultivating implements, provision is made in accordance with the invention for the skid in its uppermost position to make contact, by its rear stripping edge, with the press wheel. The jerky upward and downward movements of the skid caused by the clods then result in the removal of soil adhering to the press wheels. Such removal is improved still further when, as contemplated by the invention, extensions are disposed adjacent to the rear stripping edges of the skids on one or both sides, slightly spaced laterally from the sides of the press wheels.

To eliminate the possibility of the skis jamming at the press wheels, it is contemplated, in accordance with the invention, that the length of the skids up to their stripping edge be not greater than the shortest distance between the pivot of the skid and the tread of the press wheel.

BRIEF DESCRIPTION OF THE DRAWINGS

The invention will now be described in greater detail with reference to the accompanying drawings, wherein.

DETAILED DESCRIPTION OF THE INVENTION

Figure 1:
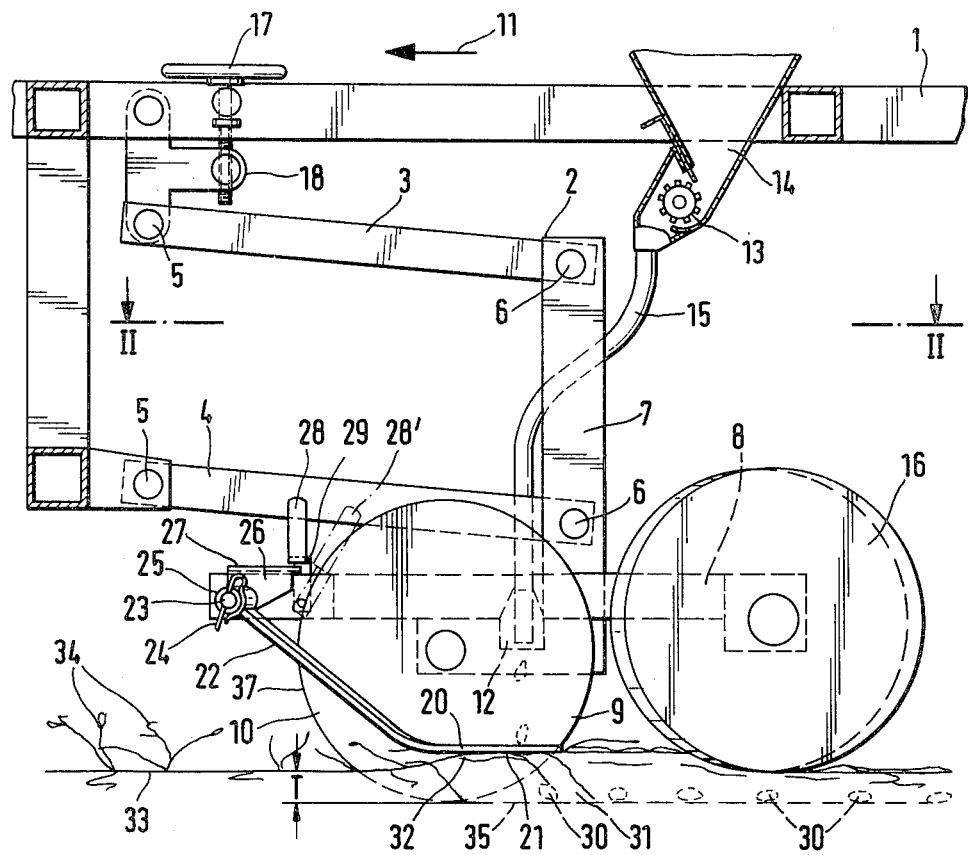
FIG. 1 is a fragmentary view of a seed drill in accordance with the invention in longitudinal section.
Figure 2:
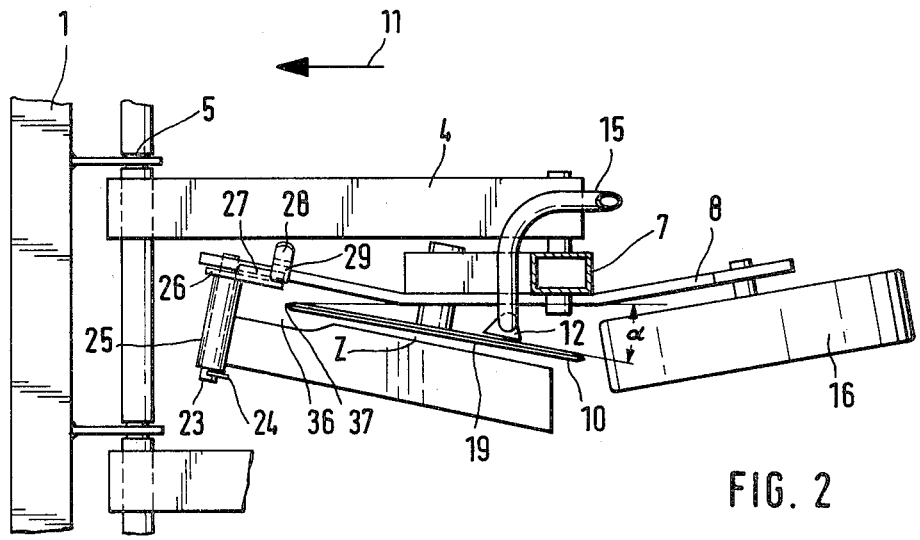
FIG. 2 is a sectional view of the mount of a furrow-opener disk of the same seed drill, taken along the line II—II.

Referring to FIGS. 1 and 2, the seed drill comprises a frame 1 on which a plurality of mounts 2 of parallelogram-like construction are arranged for displacement in the vertical plane. Each mount comprises an upper link 3 and a lower link 4 which extend parallel to each other and whose forward ends are pivotably secured to the frame 1 by means of shafts 5, their rear ends being pivoted to an upright bracket 7 by means of pins 6. Disposed at the lower end of the bracket 7 is a mounting section 8 on which the disk-type furrow opener 9 is arranged. Said furrow opener comprises a disk 10 which is mounted for free rotation on the forward-projecting portion of the mount 8 and forms an acute angle $\alpha$ relative to the direction of travel, indicated by the arrow 11. Each furrow opener 9 further comprises an outlet nozzle 12 into which a seed tube 15 connected to the measuring mechanism 13 of the seed hopper discharges.

Rotatably supported at the rear of each mounting section 8 is a press wheel 16 which in the direction of travel 11 is aligned with the furrow opener 9. The depth of penetration T of the furrow-opener disks 10 is fixed by means of the adjusting spindle 17, which cooperates with a lever mechanism 18 and can be turned to displace the upper links 3 by way of the lever mechanism 18 in the direction of travel 11.

Close to the outside 19 of each furrow-opener disk 10, set at an angle relative to the direction of travel 11, there is disposed a skid 20 whose sliding surface 21 is located above the depth of penetration T of the furrow-opener disk 10. Said skid comprises a portion 22 which obliquely extends forwardly and upwardly and whose forward end is pivoted to a pin 23 disposed on one side of the mounting section 8 and is secured against axial movement by means of a spring cotter pin 24. Removal of the skid 20 then requires nothing more than the withdrawal of the cotter pin 24 from the pin 23.

Moreover, there is welded to the bearing 25 of the skid 20 a locking member 26 whose upper, angled side 27 fits over the mounting section 8. In this way, the skids 20 are prevented from pivoting downwardly when the furrow openers 9 and the press wheels 16 are raised into the transport position. To the rear of the locking member 26, a latching member 28 is pivotably secured to the mounting section 8. In the position indicated by solid lines in FIGS. 1 and 2, the latching member 28 with its angled portion 29 is located over the locking member 26 and thus prevents the skid 20 from pivoting upwardly. This is the position which the skid 20 is to occupy when the seed drill is used in direct seeding.

When, on the other hand, the latching member 28 is pivoted into position 28', indicated by broken lines, the skid 20 is free to swing upwardly to permit the seed drill to be used in conventionally prepared fields. For this application the skids 20 may also be removed from the mounting sections 8 in the simple manner described above.

Now when the seed drill is used in direct seeding, the seeds 30 which reach the seed tubes 15 from the seed hopper 14 by way of the measuring mechanism 13 drop into the furrows 31 cut by the furrow-opener disks 10. The soil 32 raised by said disks 10 gets under the sliding surfaces 21 of the skids 20 along with the plant parts 34 present on the ground 33 and is moved back into the seeded furrows behind the furrow-opener disks 10 without being turned over. Under the action of the skids 20 and the furrow-opener disks 10, the plant parts 34 are pulled apart under stress, and the seeds 30 are thus able to drop through them to the bottom 35 of the furrows 31 and to be covered with soil. To prevent clogging of the narrow space Z between the outsides 19 of the furrow-opener disks 10 and the skids 20, the latter are each provided with a recess 36 which extends both ways beyond the periphery 37 of the furrow-opener disks 10, viewed in the direction of travel 11.

Behind the furrow openers 9, the soil returned into the seeded furrows 31 by the skids 20 is pressed down by the press wheels 16, thus providing the seeds 30 with sufficient soil contact for their germination.

Figure 3:
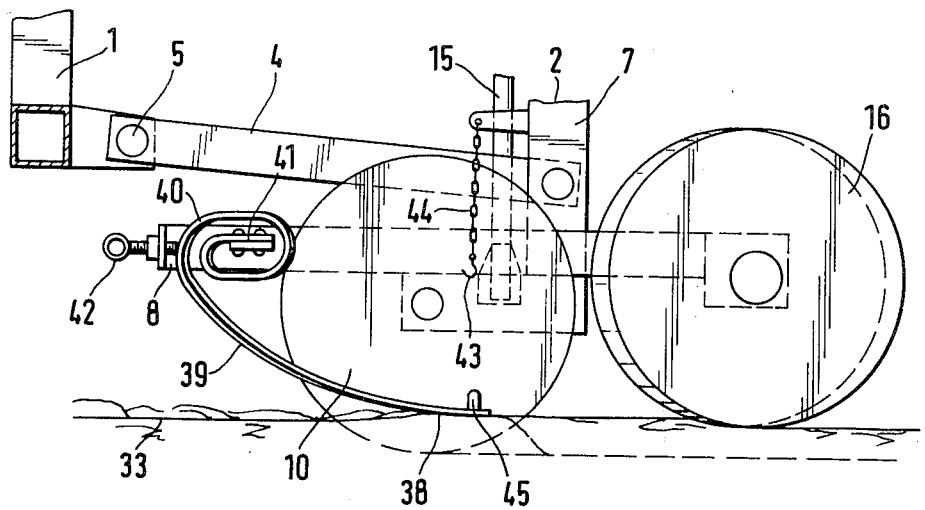
FIG. 3 is a side elevation of the same mount with a skid of different design.

In the embodiment shown in FIG. 3, the skid 38, disposed on mounting section 8 in the same position, is made of a resilient material. Moreover, the portion 39 curving forwardly and upwardly comprises a spiral 40 which surrounds the point of attachment 41 of the skid 38 on the mounting section 8. A contact member 42 in the form of an eyebolt is adjustably disposed on the mounting section 8 ahead of the spiral 40. Depending on the extent to which the eyebolt is turned in its nut, the skid 38 is raised off the ground to a greater or lesser extent.

To provide for rapid and simple changeover of the skids 38 to an inoperative position for use of the seed drill in fields which have been conventionally prepared for planting, there is disposed on every upright bracket 7 a disengaging element in the form of a chain 44 fitted with a hook 43 which is adapted to engage an eye 45 provided on each skid 38.

Figure 4:
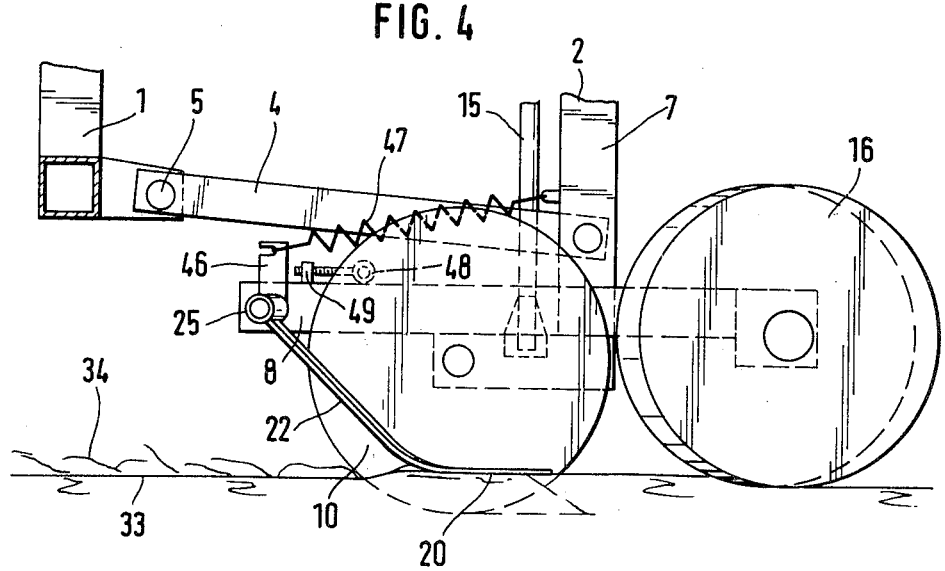
FIG. 4 is a side elevation of the same mount with a different arrangement of the skid.
Figure 5:
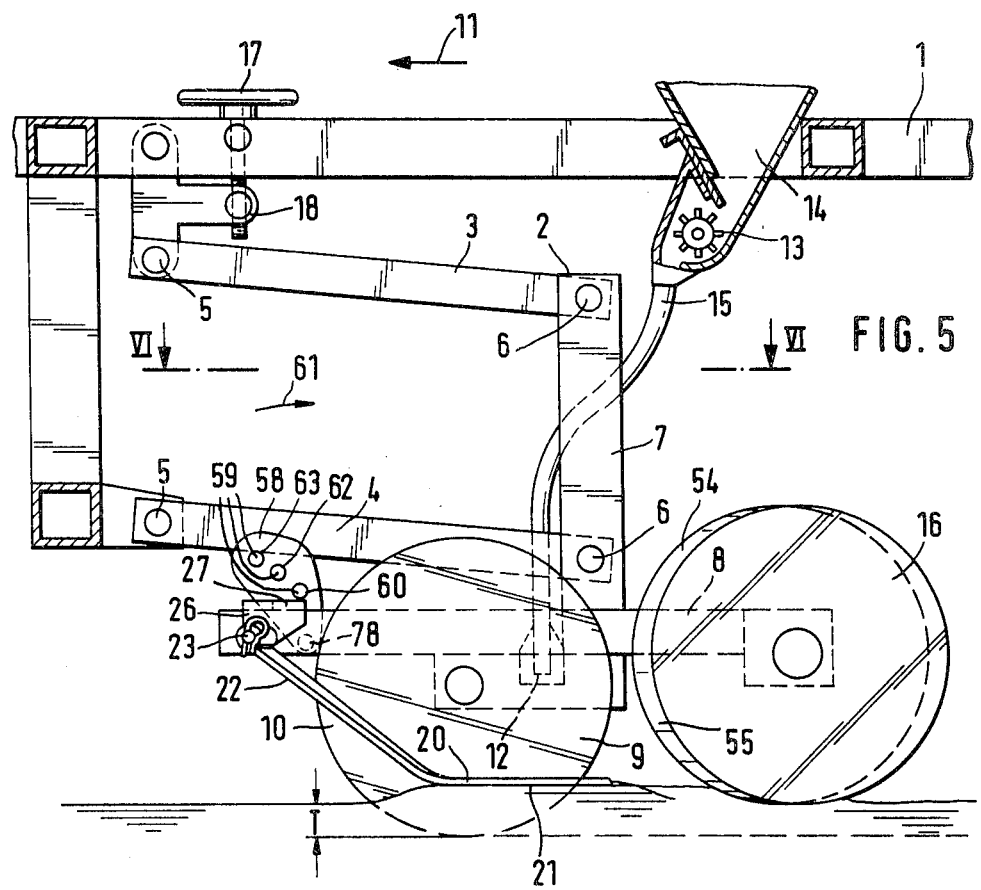
FIG. 5 is a fragmentary view of a seed drill in accordance with the invention in longitudinal section.
Figure 6:
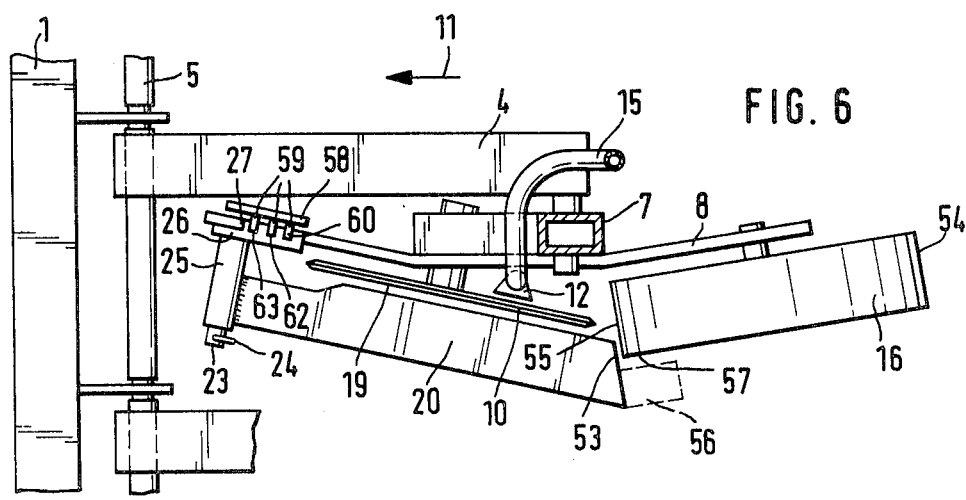
FIG. 6 is a sectional view of the mount of a furrow-opener disk of the same seed drill, taken along the line VI—VI, and of a skid constructed in accordance with the invention.

Shown in FIG. 4 is a different disposition of the skid 20 illustrated in FIGS. 1 and 2. In this arrangement, there is welded to the bearing 25 of the portion 22 extending forwardly and upwardly a lever arm 46 which projects upwardly and which through the resilient element 47, constructed as an extension spring, is fastened to the upright bracket 7. This resilient element thus exerts a force on the skid 20 in the direction of the ground 33 or of the soil 32 raised by the furrow-opener disk 10, respectively.

To provide for adaptation of every skid 20 to the volume of soil 32 or of plant parts 34 present on the ground 33, an adjustable stop 48 in the form of an eyebolt is disposed on every mounting section 8. By turning said stops 48 in their guide members 49, the skids 20 may, moreover, be raised sufficiently high to be out of contact with the soil 32 raised by the furrow-opener disks 10, thus permitting the seed drill to be used in fields which have been conventionally prepared for planting.

For more rapid changeover of the skids 20 to the inoperative position, disengaging elements 44 may be provided on the upright brackets 7 of the mounts 2 as in the embodiment illustrated in FIG. 3.

To permit the skid 20 of the seed drill according to FIGS. 5 to 8 to be adapted to the prevailing conditions of use, provision is made for three different settings. The lower position 50, in which the sliding surface 21 of the skid 20 extends parallel to the ground, is intended for use in direct seeding with a shallow depth of deposition T of the seed. Moreover, the pivoting range of the skid 20 may be fixed so that it is able to swing as far as position 51, indicated by broken lines. This setting of the skid 20 is necessary in order that the seed may be deposited at the relatively considerable depth of about 12 cm in direct seeding in very dry soils, or, in some countries, in soils which due to the prevailing climate dry out rapidly.

The seed drill may also be used in fields previously prepared for planting by means of cultivating implements. This, however, requires that the skid 20 be free to swing back and forth between position 50 and position 52, indicated by broken lines, to preclude its burrowing in the relatively loose but often lumpy soil. Since the skid 20 is of such length that when it is in position 52 its stripping edge 53 will make contact with the forward portion 55 of the tread 54 of the press wheel 16, its frequent striking or brushing against that point will rid the press wheel 16 of adhering soil.

Moreover, when it is to be used in fields previously prepared for planting by means of cultivating implements, the seed drill may be equipped with a skid 20 which comprises adjacent to its rear stripping edge 53 lateral extensions 56 indicated by broken lines. These will then strip adhering soil from the sides 57 of the press wheels 16.

The latching member 58 is pivoted to the mount 8 to the rear of the locking member 26. Said latching member comprises three projections 59 constructed as dogs. With the latching member 58 in the position shown, the locking member 26 abuts against the lowermost dog 60, which fixes the skid 20 in its lowermost position 50. When, on the other hand, the latching member 58 is swung so far in the direction indicated by the arrow 61 that the pivoting range is limited by the dog 62, the skid 20 is fixed in position 51. If the seed drill is to be used in fields which have been prepared for planting, the latching member 58 must be swung still farther in the direction of the arrow 61, with the dog 63 then forming the upper stop for the locking member 26, and the skid 20 being able to pivot as high as position 52.

Figure 7:
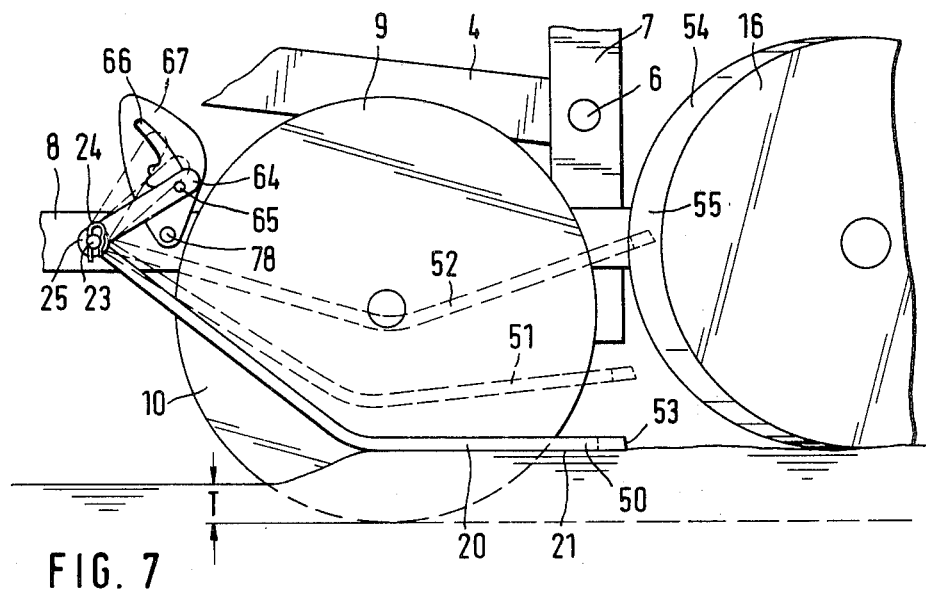
FIG. 7 is a side elevation of the same skid mount but on a different scale.
Figure 8:
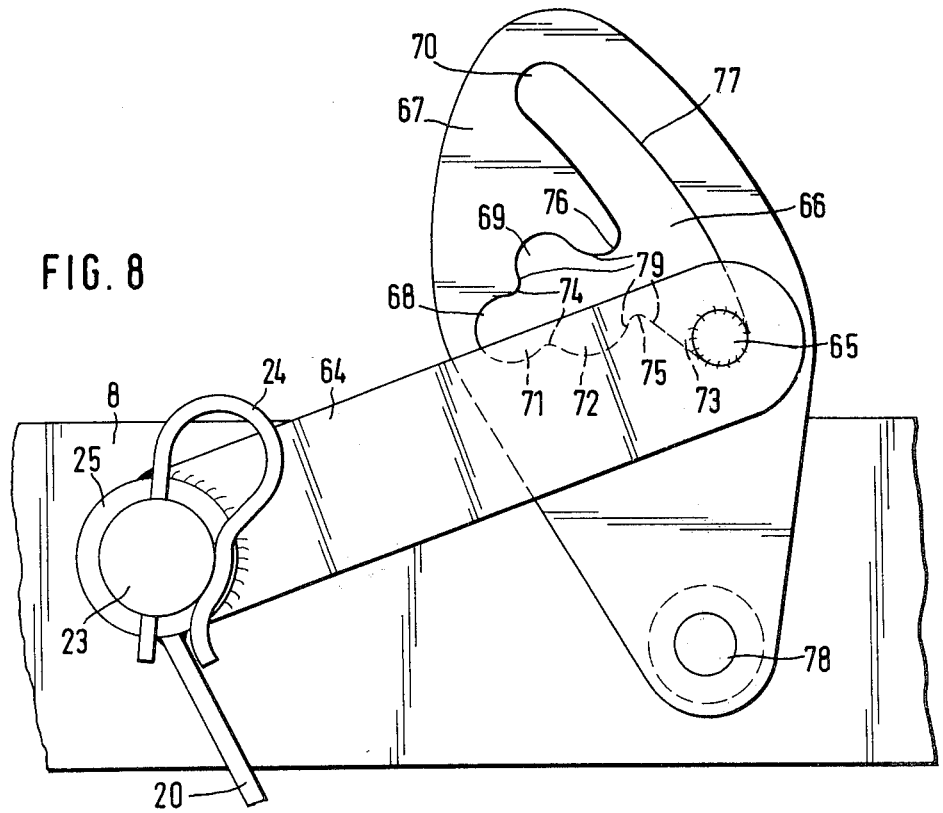
FIG. 8 is a side elevation of a latching member in accordance with the invention on an enlarged scale.

A different embodiment of the latching member and of the locking member is shown in FIGS. 7 and 8. The locking member 64 welded to the bearing 25 of the skid 20 comprises a pin 65 which drops into the slotted-link guide 66 of the latching member 67, which is pivoted to the mount 8. The slotted-link guide 66 comprises upper notches 68, 69 and 70 forming the upper stops for the positions 50, 51 and 52. In these positions, the pivoting range of the locking member 64, and hence of the skid 20, is limited in the downward direction by the notches 71, 72 and 73. Disposed between the latter are the rounded protuberances 74, 75 and 76, resulting in an arcuate contour 77.

A changeover from one setting of the skid 20 to another merely requires a sufficiently large pivoting movement of the latching member 67.

To prevent the latching members 58 and 67 from shifting by themselves in operation, there is disposed at the bearing 78 of each latching member a detentlike element, which is not novel and therefore is not shown.

However, if in rough use of the seed drill the latching member 67 should nevertheless shift slightly by itself, it will be returned to the starting position into which it was moved by the pin 65, which during the upward and downward swinging motion of the skid 20 presses onto the beveled sides 79 of the protuberances 74, 75 and 76.

It will be appreciated that the instant specification and claims are set forth by way of illustration and not of limitation, and that various changes and modifications may be made without departing from the spirit and scope of the present invention.

We claim:

1. In a seed drill having a frame, furrow opener disks rotatably mounted at an acute angle with respect to the direction of travel on supports which are movable vertically with respect to the frame, a seed outlet disposed at the inside soil nonworking surface of each disk, a skid for each disk and means mounting a skid to each support at the outside soil working surface of the disk and at an angle with respect to the direction of travel, the improvement wherein: each skid comprises a trailing portion configured to have a slidably engagable surface disposed above the depth of penetration of the disk in the ground, a leading portion bent upwardly in the direction of travel and having a recess defined in the side thereof facing the disk, the recess extending beyond the forwardmost portion of the disk in the direction of travel and the means mounting each skid comprises means releasably connecting the leading portion of the skid to the support for the pivotal movement of the trailing portion of the skid towards and away from the ground, spring means for biasing the trailing portion of the skid towards the ground and adjustable stop means to limit the pivotal movement of the trailing portion of the skid towards the ground whereby soil acted upon by the disk will be substantially prevented from being turned over but will be returned to the furrow formed by the disk in substantially the same profile as before the furrow was formed.

2. The seed drill according to claim 1, wherein the means releasably connecting each skid comprises a locking member connected to the skid and receivable on the support and a latching member connected to the support and releasably engageable with the locking member to prevent free pivotal movement of the skid in the upward direction.

3. The seed drill according to claim 1, wherein the spring means comprises the skids formed from resilient material, leading portion of each skid comprises a spiral which surrounds the connection to the support, and wherein the adjustable stop means comprises a contact member acting externally on said spiral and a disengaging element for fixing the skid in a position spaced from the ground.

4. The seed drill according to claim 1, further comprising an arm pivotable with each skid and wherein the spring means is connected between each arm and the support and the stop means comprises means cooperating with the arm.

5. The seed drill according to claim 1, wherein the stop means comprises a plate having slotted-link guide with arcuate contours and protuberances received in the guides.

6. The seed drill according to claim 1, further comprising a press wheel mounted on each support and wherein each skid has a rearmost edge which contacts one press wheel when in the position furthest from the ground.

7. The seed drill according to claim 6, wherein each skid includes an extension at the rearmost edge and which is adjacent to the outside surface of the press wheel and not contacting the same.

* * * * *